(No Model.)
F. DEIMEL.
SAFETY STOPPER.
No. 427,255. Patented May 6, 1890.
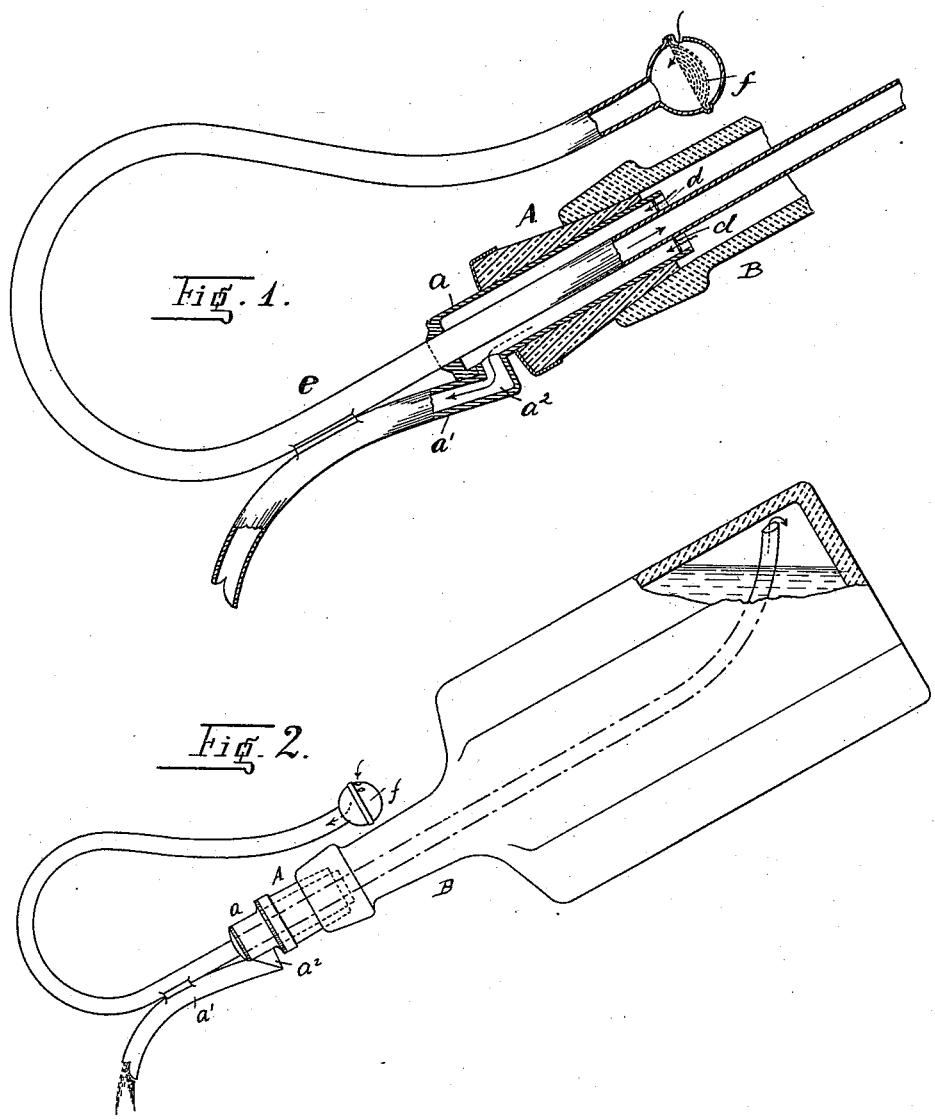
Witnesses.
Henry Huber
W. Feinherr.
Inventor
Fritz Deimel
by
Goepel & Raegener
Attorneys.

UNITED STATES PATENT OFFICE.

FRITZ DEIMEL, OF BERLIN, GERMANY.

SAFETY-STOPPER.

SPECIFICATION forming part of Letters Patent No. 427,255, dated May 6, 1890.

Application filed December 21, 1889. Serial No. 334,484. (No model.)

*To all whom it may concern:*

Be it known that I, FRITZ DEIMEL, of Berlin, Germany, a subject of the Emperor of Germany, have invented certain new and useful Improvements in Safety-Stoppers, of which the following is a specification.

The object of this invention is to provide a safety-stopper for vessels or cans containing petroleum, alcohol, benzine, or other highly-inflammable liquids, said stopper serving to prevent an explosion of the contents of the bottle even when the fluid is poured directly into the fire.

The invention consists in the construction and combination of parts and details, as will be fully described hereinafter, and finally be pointed out in the claims.

In the accompanying drawings, Figure 1 is a vertical longitudinal sectional view of my improved safety-stopper, parts being shown in elevation. Fig. 2 is a side view of a bottle provided with my improved stopper, part of the bottle being broken out.

Similar letters of reference indicate corresponding parts.

The body A of the stopper is made of cork or any other suitable material, and is of such shape and size that when inserted into the neck B of the bottle it closes the same air-tight. Into the central bore of the said stopper A a tube $a$ is placed, which is closed at the outer end and open at the inner end, so as to form a hollow cylindrical space in the stopper. A curved outlet-tube $a'$, having a bend $a^2$, is connected with the outer end of said tube $a$. A tube $e$ is passed centrally through the tube $a$ in the stopper A, the inner end of said tube $e$ extending to the bottom of the bottle, where it is bent laterally, as shown in Fig. 2, and the outer end of said tube $e$ is curved, as shown, and provided with a ball-shaped screen $f$ on its end. The inner open end of the tube $a$ is provided with a screen $d$.

The operation is as follows: To pour liquid from the bottle provided with my improved stopper, it is brought into the position shown in Fig. 2, so that the liquid can pass through the fine sieve or screen $d$ into the tube $a$, from which it passes to the outlet tube or nozzle $a'$. The bend $a^2$ of the nozzle $a'$ forms a trap, which prevents the passage of air through the nozzle into the bottle. In case the liquid being poured from the nozzle $a'$ should accidentally become ignited the screen $d$ prevents the flame passing into the bottle. The tube $e$ prevents the collection of vapors under pressure in the bottle, and the bent outer end of said tube prevents the liquid contained in said bent tube from flowing out in case the bottle is inclined. In case the tension of the vapors in the bottle is so low that the same cannot force out the liquid or cause the flow of the same, the air enters through the ball screen $f$ into the tube $e$ and passes into the bottle.

A bottle or vessel provided with my improved stopper is at all times safe against explosion and can safely be used for pouring highly-inflammable liquids upon flames, or for filling lamps while burning. All highly-inflammable fluids that cause explosions of their receptacles cannot burn if the flame is prevented from passing into the interior of the vessel, and explosions are avoided if the accumulation of gases in the bottle is prevented. All this is accomplished by my improved stopper.

Having thus described my invention, I claim as new and desire to secure by Letters Patent—

1. The combination, with a stopper, of a tube in the same provided at its outer end with an outlet tube or nozzle, an air-inlet tube passing through the tube in the stopper, and provided at its outer end with a screen, substantially as set forth.

2. The combination, with a stopper, of a tube in the same, a screen at the inner end of said tube, an outlet tube or nozzle on the outer end of the tube in the stopper, and an air-tube passing through the tube in the stopper and provided at its curved end with a screen, as set forth.

In witness whereof I have hereunto set my hand in presence of two witnesses.

FRITZ DEIMEL.

Witnesses:
  A. REICHARDT,
  BRUNO EBERTH.